Oct. 30, 1923.
E. I. DODDS
1,472,387
STAY BOLT STRUCTURE
Filed Feb. 16, 1921
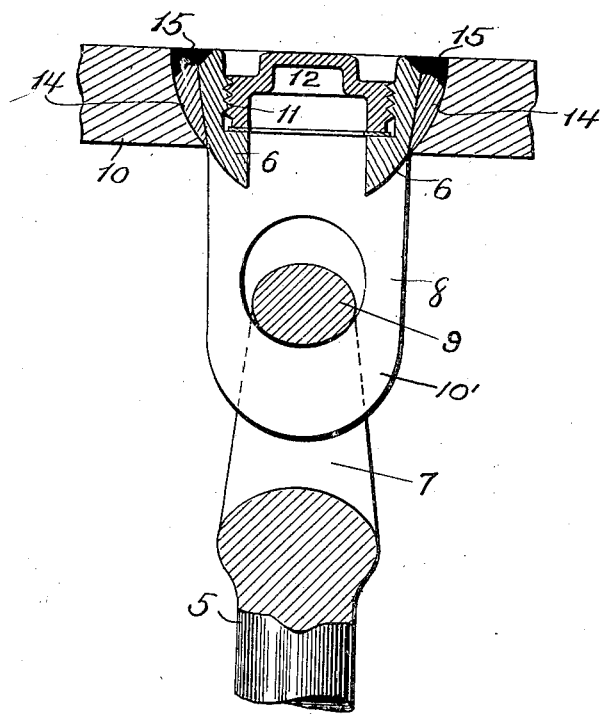

Patented Oct. 30, 1923.

1,472,387

UNITED STATES PATENT OFFICE.

ETHAN I. DODDS, OF CENTRAL VALLEY, NEW YORK, ASSIGNOR TO FLANNERY BOLT COMPANY, OF PITTSBURGH, PENNSYLVANIA, A CORPORATION OF DELAWARE.

STAY-BOLT STRUCTURE.

Application filed February 16, 1921. Serial No. 445,456.

*To all whom it may concern:*

Be it known that I, ETHAN I. DODDS, a citizen of the United States, and a resident of Central Valley, in the county of Orange and State of New York, have invented certain new and useful Improvements in Stay-Bolt Structures; and I do hereby declare the following to be a full, clear, and exact description of the invention, such as will enable others skilled in the art to which it appertains to make and use the same.

My invention relates to an improvement in staybolt construction, the object being to provide improved means for securing the link type of bolt to the outer sheet of the boiler and it consists in the details of construction as will be more fully described and pointed out in the claims.

The accompanying drawing is a sectional view showing an embodiment of my invention.

The link bolt consists of a shank 5 and a head 6 the former of which is provided with an elongated eye or loop 7 and the latter with an elongated loop 8, the end members 9 and 10' respectively of the loops of the shank and head passing through the loop of the other member in the manner of a chain link thus forming a universal connection between the bolt shank and head which will permit either to move freely with relation to the other so as to accommodate itself to the movement of the boiler sheet to which it may be connected. These links are connected by hammering or forging in the same manner as chain links and the free end of the shank is adapted to be threaded for attachment to the inner sheet of the boiler in the usual and well known manner.

The outer sheet 10 of the boiler is provided with a bolt opening, which is made conical and curved in the arc of a circle with its greatest diameter at the top to receive the bolt bearing member 14 which, in effect, forms part of the end structure and is externally the segment of sphere corresponding in diameter and shape with the curved bolt opening. This bolt bearing member is provided centrally with a conical opening to receive the head 6. The head 6 may be solid, but I prefer to provide it with a central threaded opening 11 normally closed by the screw plug or cap 12, which when in place forms a steam tight joint and prevents the escape of any steam. I have shown the head as flush with the outer surface of the sheet 10 but this is not essential, as it may project outside the sheet or terminate between the inner outer surface of the sheet, the principal feature thereof being that it is conical and of such size that it cannot pass through the bolt opening in the sheet.

The looped end of shank 5 is of less diameter than the smallest diameter of the bolt opening so that it may be passed therethrough in assembling the parts, which latter is done by passing the shank 5 through the bolt opening and screwing it to the inner sheet (not shown) by turning the head 6. After the shank has been screwed home so that there is no slack between the head 6 and the shank 5, and the former is firmly seated, it is permanently secured to the sheet by welding.

The bolt bearing member can be initially adjusted so that the long axis of the head will be coincident with the long axis of the shank of the bolt 5, thus specially adapting the latter for use or in positions where the bolt is oblique to the boiler sheets.

After the parts have been properly assembled in the boiler sheets, the bearing member 14 and head 6 are permanently secured by welding them both as at 15 to the boiler sheet 10, thus preventing any movement of the bearing member in the outer sheet or any movement of the head in the bearing member, and also forming a steam tight joint between the head and the bearing member and between the latter and the sheet 10.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. In a stay bolt construction, the combination of a two part bolt consisting of a shank and a head connected by a link joint the outer end of the head being conical, a boiler sheet having a bolt hole the wall of which is in the segment of a sphere, and a bolt bearing member formed in the arc of a circle and initially adustable in the opening for the bolt, the said bolt bearing member and conical head being welded together and also to the sheet.

2. In a staybolt construction, the combination of a two part bolt consisting of a shank and a head connected by a link joint the outer end of the head member of the bolt being conical, a boiler sheet having a bolt hole the wall of which is in the segment of a sphere and a bolt bearing member formed in the arc of a circle and initially adjustable in the opening for the bolt and provided with a conical seat for the conical outer end of the head member of the bolt, the said bolt bearing member and conical head being welded together and also to the outer sheet of the boiler.

In testimony whereof, I have signed this specification in the presence of a subscribing witness.

ETHAN I. DODDS.

Witness:
EDWIN S. RYCE.